(12) United States Patent
Ojima

(10) Patent No.: US 9,387,399 B2
(45) Date of Patent: Jul. 12, 2016

(54) GAME DEVICE, METHOD OF CONTROLLING A GAME DEVICE, AND INFORMATION STORAGE MEDIUM

(75) Inventor: Masatoshi Ojima, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 262 days.

(21) Appl. No.: 13/489,121

(22) Filed: Jun. 5, 2012

(65) Prior Publication Data

US 2012/0309479 A1 Dec. 6, 2012

(30) Foreign Application Priority Data

Jun. 6, 2011 (JP) .................................. 2011-126031

(51) Int. Cl.
*A63F 13/10* (2006.01)
*A63F 13/40* (2014.01)

(52) U.S. Cl.
CPC .......... *A63F 13/10* (2013.01); *A63F 2300/1006* (2013.01); *A63F 2300/64* (2013.01); *A63F 2300/65* (2013.01); *A63F 2300/6623* (2013.01); *A63F 2300/8011* (2013.01)

(58) Field of Classification Search
CPC ................................. A63F 13/10; A63F 13/12
USPC ....................................................... 463/4, 31
See application file for complete search history.

(56) References Cited

U.S. PATENT DOCUMENTS

| | | | | |
|---|---|---|---|---|
| 8,043,149 B2 * | 10/2011 | Ortiz et al. | ........................ | 463/2 |
| 2005/0003877 A1 * | 1/2005 | Cummings | ........................ | 463/4 |
| 2006/0252538 A1 * | 11/2006 | Olsen et al. | ..................... | 463/36 |
| 2007/0232375 A1 * | 10/2007 | Izumi et al. | ........................ | 463/7 |
| 2011/0244934 A1 * | 10/2011 | Yanagihara et al. | ............. | 463/4 |
| 2011/0306415 A1 * | 12/2011 | Tanaka | ............................ | 463/31 |
| 2011/0319159 A1 | 12/2011 | Kondo et al. | | |

(Continued)

FOREIGN PATENT DOCUMENTS

JP 2007-160006 A 6/2007
JP 2010-154947 A 7/2010

OTHER PUBLICATIONS

"FIFA Soccer 11" published on or before Sep. 28, 2010 and available at URL <http://www.allgame.com/game.php?id=72640& tab=controls> and <http://www.allgame.com/game.php?id=72640& tab=overview>, 6 pages.*

(Continued)

*Primary Examiner* — Jason Skaarup

(74) *Attorney, Agent, or Firm* — Sughrue Mion, PLLC

(57) ABSTRACT

A switching section switches an operation subject of a user among a plurality of game characters. A first control section causes the game character that is set as the operation subject of the user among the plurality of game characters to behave based on a direction acquired based on an operation state of a first operation member. A second control section causes the game character that is not set as the operation subject of the user among the plurality of game characters to behave based on an operation of a computer. A selection section selects any one of the game characters controlled by the second control section based on a direction acquired based on an operation state of a second operation member. The switching section switches the operation subject of the user to the game character selected by the selection section.

14 Claims, 9 Drawing Sheets

| COMBINATION OF GAME CHARACTERS | COOPERATIVENESS PARAMETER(p) |
|---|---|
| P101, P102 | 32 |
| P101, P103 | 68 |
| ... | ... |
| P110, P111 | 97 |

| COOPERATIVENESS PARAMETER(p) | RESTRICTION CONTENT |
|---|---|
| $0 \leq p < 30$ | RESTRICTION CONTENT A |
| $30 \leq p < 60$ | RESTRICTION CONTENT B |
| $60 \leq p \leq 100$ | NO RESTRICTION |

(56) References Cited

U.S. PATENT DOCUMENTS

2012/0019472 A1* 1/2012 Tomita et al. .................. 345/173
2012/0021830 A1* 1/2012 Tomita et al. .................... 463/31

OTHER PUBLICATIONS

"FIFA 11 Directional Player Switch" published on or before Jun. 2, 2011 and available at URL <http://forum.ea.com/uk/posts/list/283617.page>, 8 pages.*

"Madden NFL 11 controls" published on or before Aug. 10, 2010 and available at URL <http://www.allgame.com/game.php?id=71847&tab=controls>, 3 pages.*

"X-Men Vs Street Fighter—One Credit Expert Difficulty (1/2)", published by MRMIdAS2k on Aug. 24, 2007 via YouTube, printed from and accessible at URL <https://www.youtube.com/watch?v=2NoL1xy6vC8>, 3 pages.*

"Classic Game Room : X-Men Vs. Street Fighter for Sega Saturn review", published by Lord Karnage on Jan. 8, 2011 via YouTube, printed from and accessible at URL <https://www.youtube.com/watch?v=UUIjXBBe2N0>, 3 pages.*

"Jikkyo Powerful Pro Yakyu Basic-ban 2001", Perfect Guide, Konami Corporation, First edition, Jun. 27, 2001, pp. 8-9, the descriptions about "Defence Type-B".

Japanese Office Action dated Jul. 10, 2012, issued in corresponding Japanese Patent Application No. 2011-126031.

* cited by examiner

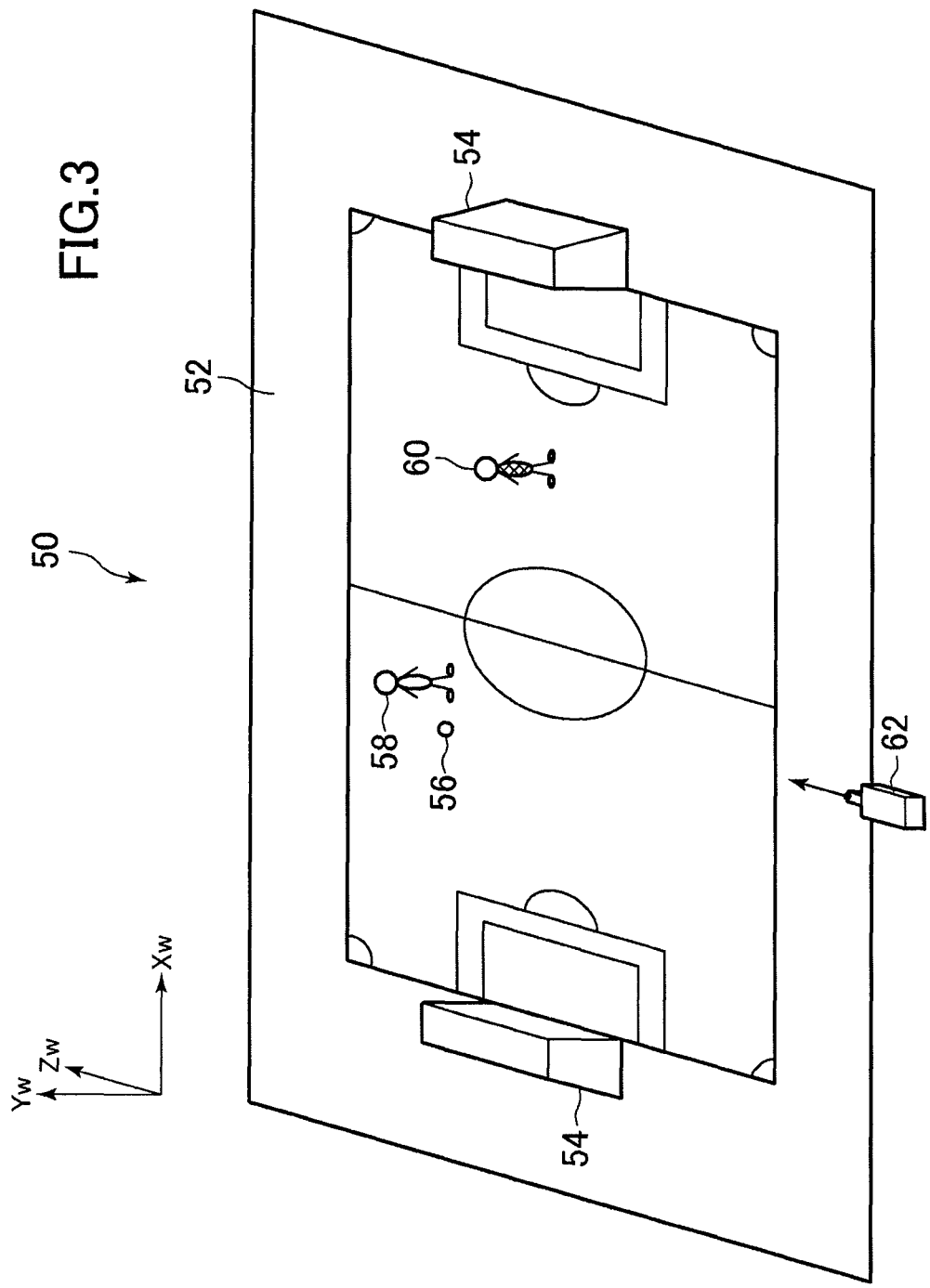

| ID | POSITION | MOVING DIRECTION | OPERATION SUBJECT FLAG | BALL KEEP FLAG | ... |
|---|---|---|---|---|---|
| P101 | --- | --- | 0 | 0 | ... |
| P102 | --- | --- | 0 | 0 | ... |
| ... | ... | ... | ... | ... | ... |
| P110 | --- | --- | 1 | 1 | ... |
| P111 | --- | --- | 0 | 0 | ... |
| P201 | --- | --- | 0 | 0 | ... |
| P202 | --- | --- | 0 | 0 | ... |
| ... | ... | ... | ... | ... | ... |
| P210 | --- | --- | 0 | 0 | ... |
| P211 | --- | --- | 0 | 0 | ... |

| SITUATION OF MATCH | TYPE OF GAME CHARACTER TO BE SELECTED |
|---|---|
| ----- | ----- |
| ----- | ----- |
| ... | ... |

| TACTICS | TYPE OF GAME CHARACTER TO BE SELECTED |
|---|---|
| ----- | ----- |
| ----- | ----- |
| ... | ... |

FIG.14

| ABILITY PARAMETER(p) | RESTRICTION CONTENT |
|---|---|
| $0 \leq p < 30$ | RESTRICTION CONTENT A |
| $30 \leq p < 60$ | RESTRICTION CONTENT B |
| $60 \leq p \leq 100$ | NO RESTRICTION |

FIG.15

| COMBINATION OF GAME CHARACTERS | COOPERATIVENESS PARAMETER(p) |
|---|---|
| P101, P102 | 32 |
| P101, P103 | 68 |
| ... | ... |
| P110, P111 | 97 |

FIG.16

| COOPERATIVENESS PARAMETER(p) | RESTRICTION CONTENT |
|---|---|
| $0 \leq p < 30$ | RESTRICTION CONTENT A |
| $30 \leq p < 60$ | RESTRICTION CONTENT B |
| $60 \leq p \leq 100$ | NO RESTRICTION |

GAME DEVICE, METHOD OF CONTROLLING A GAME DEVICE, AND INFORMATION STORAGE MEDIUM

CROSS-REFERENCE TO RELATED APPLICATION

The present application claims priority from Japanese application JP 2011-126031 filed on Jun. 6, 2011, the content of which is hereby incorporated by reference into this application.

BACKGROUND OF THE INVENTION

1. Field of the Invention

The present invention relates to a game device, a method of controlling a game device, and an information storage medium.

2. Description of the Related Art

There is known a game configured such that an operation subject of a user is switched among a plurality of game characters (for example, JP 2010-154947A). For example, a soccer game is configured such that the operation subject of the user is switched among the plurality of game characters belonging to a user team operated by the user. Specifically, the soccer game is configured such that each time the user depresses a predetermined button, the operation subject of the user is switched among the plurality of game characters belonging to the user team in accordance with an order determined in consideration of positions of the respective game characters belonging to the user team and a position of a ball (for example, order determined in such a manner that the game character closest to the ball ranks first).

SUMMARY OF THE INVENTION

However, in such a game as described above, it is sometimes hard for the user to switch the operation subject to a desired game character. For example, in such a soccer game as described above, the operation subject will not switched to the desired game character only by depressing the button once in a case where the switching rank of the desired game character is low, and hence the user needs to repeatedly depress the button until the operation subject is switched to the desired game character.

The present invention has been made in view of the above-mentioned problem, and an object thereof is to provide a game device, a method of controlling a game device, and an information storage medium, which enable a user to switch an operation subject to a desired game character with ease.

In order to solve the above-mentioned problem, according to an exemplary embodiment of the present invention, there is provided a game device, including: a first operation member for allowing a user to perform a direction instruction operation; a second operation member for allowing the user to perform a direction instruction operation; switching means for switching an operation subject of the user among a plurality of game characters; first control means for causing the game character that is set as the operation subject of the user among the plurality of game characters to behave based on a direction acquired based on an operation state of the first operation member; and second control means for causing the game character that is not set as the operation subject of the user among the plurality of game characters to behave based on an operation of a computer. Further, the switching means includes selection means for selecting any one of the game characters controlled by the second control means based on a direction acquired based on an operation state of the second operation member, and the switching means switches the operation subject of the user to the any one of the game characters selected by the selection means.

According to an exemplary embodiment of the present invention, there is also provided a method of controlling a game device. The game device includes: a first operation member for allowing a user to perform a direction instruction operation; and a second operation member for allowing the user to perform a direction instruction operation. The method includes: a switching step of switching an operation subject of the user among a plurality of game characters; a first control step of causing the game character that is set as the operation subject of the user among the plurality of game characters to behave based on a direction acquired based on an operation state of the first operation member; and a second control step of causing the game character that is not set as the operation subject of the user among the plurality of game characters to behave based on an operation of a computer. Further, the switching step includes: a selection step of selecting any one of the game characters controlled by the second control step based on a direction acquired based on an operation state of the second operation member; and a step of switching the operation subject of the user to the any one of the game characters selected by the selection step.

According to an exemplary embodiment of the present invention, there is also provided a program for causing a computer to function as a game device. The computer includes: a first operation member for allowing a user to perform a direction instruction operation; and a second operation member for allowing the user to perform a direction instruction operation. The program causes the computer to function as: switching means for switching an operation subject of the user among a plurality of game characters; first control means for causing the game character that is set as the operation subject of the user among the plurality of game characters to behave based on a direction acquired based on an operation state of the first operation member; and second control means for causing the game character that is not set as the operation subject of the user among the plurality of game characters to behave based on an operation of the computer. Further, the switching means includes selection means for selecting any one of the game characters controlled by the second control means based on a direction acquired based on an operation state of the second operation member; and the switching means switches the operation subject of the user to the any one of the game characters selected by the selection means.

According to an exemplary embodiment of the present invention, there is also provided a non-transitory computer readable information storage medium storing the above-mentioned program.

According to the exemplary embodiment of the present invention, it is possible to allow the user to switch the operation subject to the desired game character with ease.

Further, according to the exemplary embodiment of the present invention, the selection means may select the any one of the game characters controlled by the second control means based on (1) a distance between the game character controlled by the first control means and the game character controlled by the second control means and (2) an angle between a straight line that extends from a position of the game character controlled by the first control means in the direction acquired based on the operation state of the second operation member and a straight line that extends from the position of the game character controlled by the first control means toward a position of the game character controlled by the second control means.

Further, according to the exemplary embodiment of the present invention, the game device may execute a game that imitates a competitive sport, performed by using a moving object, between a user team corresponding to the user and an opponent team, the plurality of game characters may be a plurality of game characters belonging to the user team, and the selection means may select the any one of the game characters controlled by the second control means based on (1) a distance between the moving object and the game character controlled by the second control means and (2) an angle between a straight line that extends from a position of the moving object in the direction acquired based on the operation state of the second operation member and a straight line that extends from the position of the moving object toward a position of the game character controlled by the second control means.

Further, according to the exemplary embodiment of the present invention, the game device may further include means for acquiring a storage content of means for storing a parameter in association with a combination of the plurality of game characters, and restriction means for restricting, in a case where the operation subject of the user is switched by the switching means from a first game character to a second game character, an action of the second game character obtained after the operation subject of the user has been switched to the second game character based on the parameter associated with the combination of the first game character and the second game character.

Further, according to the exemplary embodiment of the present invention, the restriction means may restrict, in the case where the operation subject of the user is switched by the switching means from the first game character to the second game character, a number of directions in which the second game character can move after the operation subject of the user has been switched to the second game character based on the parameter associated with the combination of the first game character and the second game character.

Further, according to the exemplary embodiment of the present invention, an opponent character that opposes the plurality of game characters may be disposed in a game space, and the selection means may select the any one of the game characters controlled by the second control means based on a relationship between a direction from a position of the game character controlled by the first control means to a position of the game character controlled by the second control means, and a position of the opponent character.

Further, according to the exemplary embodiment of the present invention, the game device may execute a game being a soccer game that imitates a soccer match performed between a user team corresponding to the user and an opponent team, the plurality of game characters may be a plurality of game characters belonging to the user team, the switching means may switch the operation subject of the user among the plurality of game characters belonging to the user team during a period of time before one of a free kick, a corner kick, a goal kick, and a throw-in is performed in a scene in which any one of the plurality of game characters belonging to the user team performs the one of the free kick, the corner kick, the goal kick, and the throw-in, the first control means may cause, during the period of time, the game character that is set as the operation subject of the user among the plurality of game characters belonging to the user team to behave based on the direction acquired based on the operation state of the first operation member, the second control means may cause, during the period of time, the game character that is not set as the operation subject of the user among the plurality of game characters belonging to the user team to behave based on the operation of the computer, the selection means may select, during the period of time, the any one of the game characters controlled by the second control means based on the direction acquired based on the operation state of the second operation member, the switching means may switch, in a case where the any one of the game characters controlled by the second control means is selected by the selection means during the period of time, the operation subject of the user to the any one of the game characters selected by the selection means, and the game device may cause, in a case where a predetermined execution instruction operation is performed during the period of time, the game character that performs the one of the free kick, the corner kick, the goal kick, and the throw-in to execute a pass to the game character controlled by the first control means.

Further, according to the exemplary embodiment of the present invention, the game device may further include means for restricting one of selection performed by the selection means during the period of time and switching performed by the switching means during the period of time based on ability information relating to abilities of the game character that performs the one of the free kick, the corner kick, the goal kick, and the throw-in.

Further, according to the exemplary embodiment of the present invention, the game device may further include means for restricting a number of times that the switching means can switch the operation subject of the user during the period of time based on the ability information.

Further, according to the exemplary embodiment of the present invention, the game device may further include means for restricting the game character that can be selected by the selection means during the period of time based on the ability information.

BRIEF DESCRIPTION OF THE DRAWINGS

In the accompanying drawings:

FIG. 3 is a diagram illustrating an example of a game space;

FIG. 14 is a diagram illustrating an example of restricted content data;

FIG. 15 is a diagram illustrating an example of cooperativeness parameter data; and FIG. 16 is a diagram illustrating an example of the restricted content data.

DETAILED DESCRIPTION OF THE INVENTION

Hereinbelow, detailed description is given of an exemplary embodiment of the present invention based on the accompanying drawings. A game device according to the embodiment of the present invention is implemented by, for example, a consumer game machine (stationary game machine), a portable game machine, a mobile phone, a personal digital assistant (PDA), or a personal computer. In this specification, description is given of a case where the game device according to the embodiment of the present invention is implemented by a consumer game machine.

Figure 1:
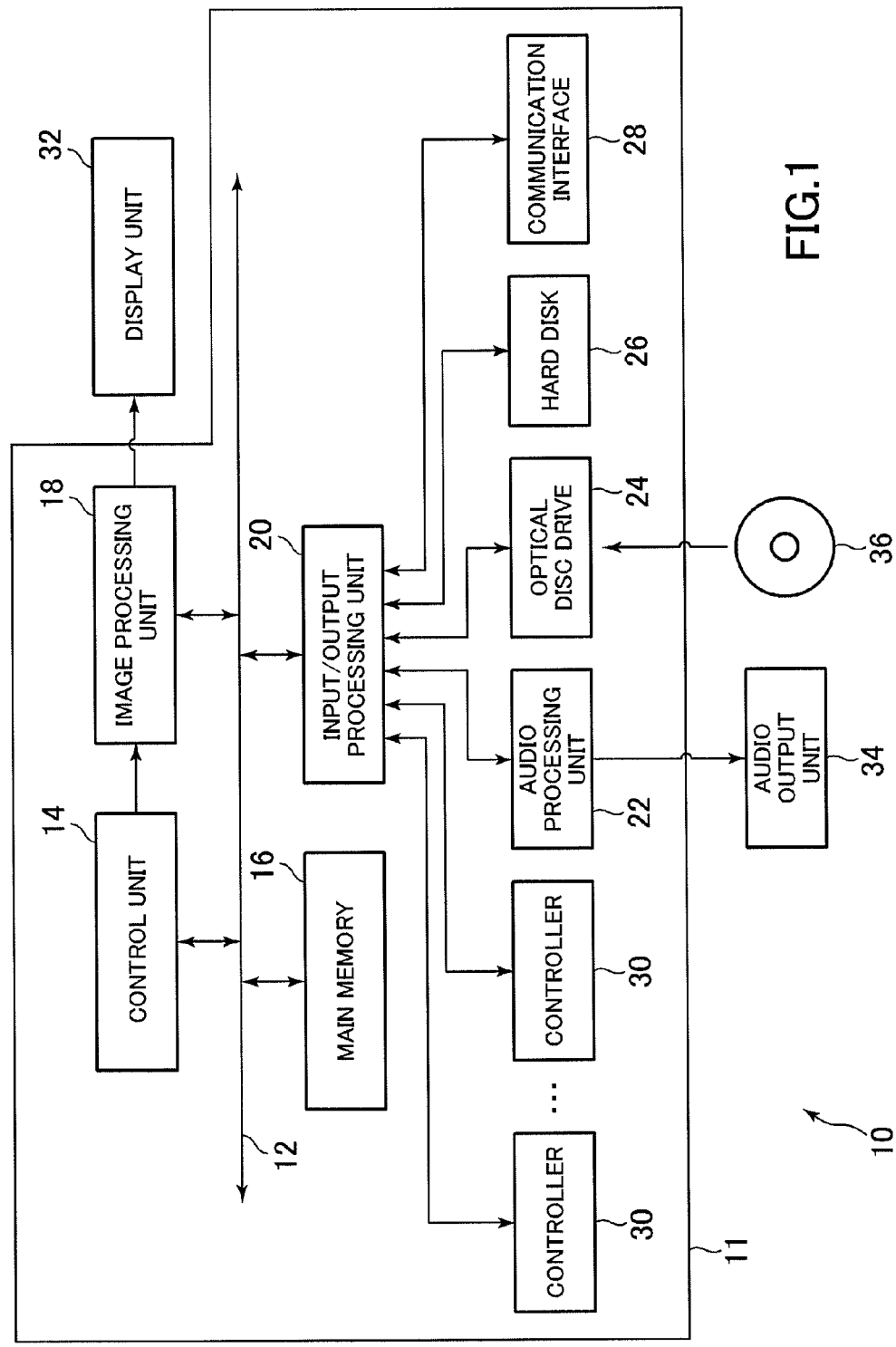
FIG. 1 is a diagram illustrating a hardware configuration of a game device according to an embodiment of the present invention.

FIG. 1 illustrates a hardware configuration of the game device according to the embodiment of the present invention. A game device 10 illustrated in FIG. 1 includes a consumer game machine 11, a display unit 32, an audio output unit 34, and an optical disc 36 (information storage medium). The display unit 32 and the audio output unit 34 are connected to the consumer game machine 11. For example, a home-use television set or a liquid crystal display is used as the display unit 32. For example, a speaker or headphones built into the home-use television set are used as the audio output unit 34.

The consumer game machine 11 is a publicly-known computer system. The consumer game machine 11 includes a bus 12, a control unit 14, a main memory 16, an image processing unit 18, an input/output processing unit 20, an audio processing unit 22, an optical disc drive 24, a hard disk 26, a communication interface 28, and a controller 30.

The control unit 14 includes one or a plurality of microprocessors. The control unit 14 executes control processing on the respective units and information processing based on a program read from the optical disc 36. The main memory 16 includes a RAM, for example, and programs and data read from the optical disc 36 are written into the main memory 16. The main memory 16 is also used as a working memory for the control unit 14. The bus 12 is used for communicating addresses and data among the respective units of the consumer game machine 11.

The image processing unit 18 includes a VRAM, and renders a screen on the VRAM based on image data supplied from the control unit 14. The screen rendered on the VRAM is converted into video signals, and the video signals are then output to the display unit 32.

The input/output processing unit 20 is an interface for the control unit 14 to access the audio processing unit 22, the optical disc drive 24, the hard disk 26, the communication interface 28, and the controller 30. The audio processing unit 22 includes a sound buffer, and outputs, from the audio output unit 34, audio data loaded from the optical disc 36 into the sound buffer. The communication interface 28 is an interface for connecting the consumer game machine 11 by wire or wireless to a communication network, such as the Internet.

The optical disc drive 24 reads programs and data recorded on the optical disc 36. In this specification, the optical disc 36 is used to supply programs and data to the consumer game machine 11, but another information storage medium, such as a memory card, may be used. Further, for example, programs and data may be supplied to the consumer game machine 11 from a remote location via a communication network. The hard disk 26 is a commonly-used hard disk device (auxiliary storage device). Note that the programs and data that are described as being stored in the optical disc 36 may be stored in the hard disk 26 instead. Further, the game device 10 may include a solid-state drive in place of the hard disk 26.

Figure 2A:
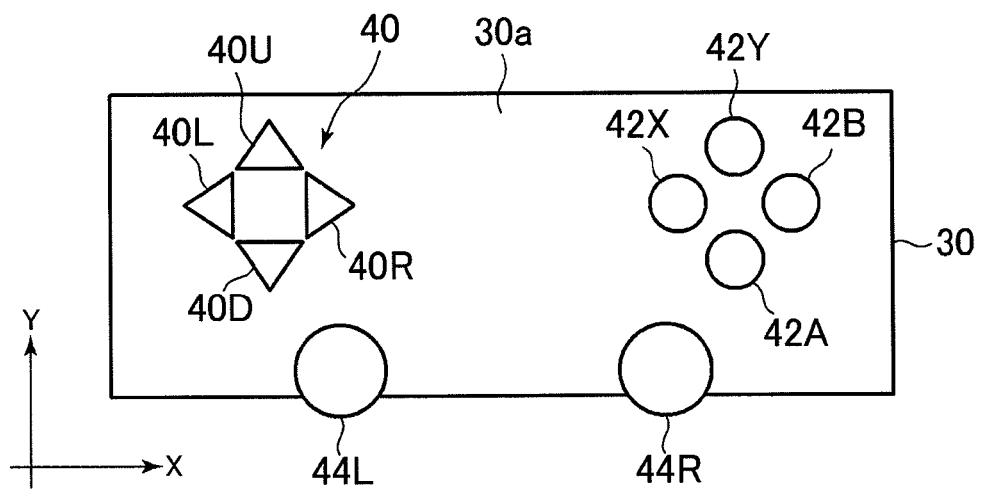
FIG. 2A is a diagram illustrating an example of a controller.
Figure 2B:
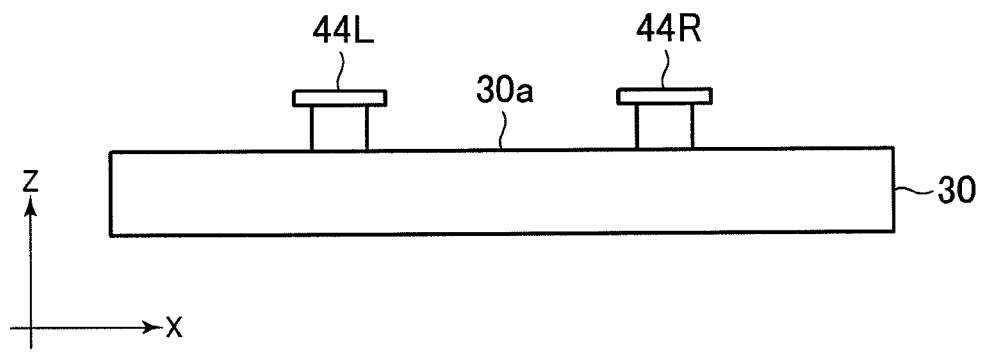
FIG. 2B is a diagram illustrating an example of the controller.

The controller 30 is an operation unit for receiving operations performed by a user. One or a plurality of the controllers 30 can be connected to the consumer game machine 11 by wire or wireless. FIG. 2A and FIG. 2B illustrate one example of the controller 30. Note that, in FIG. 2A, an X-axis corresponds to a long-axis direction of the controller 30 (left-right direction), and a Y-axis corresponds to a short-axis direction of the controller 30 (up-down direction). The X-axis and the Y-axis are orthogonal to each other. Further, in FIG. 2B, a Z-axis corresponds to a direction of the normal to a surface 30a of the controller 30.

The surface 30a of the controller 30 includes a plurality of operation members. For example, the surface 30a of the controller 30 includes a direction button group 40, buttons 42A, 42B, 42×, and 42Y, a left stick (lever) 44L, and a right stick (lever) 44R.

The direction button group 40 is used for an operation of specifying a direction, for example. The direction button group 40 includes an up direction button 40U corresponding to an upward direction, a down direction button 40D corresponding to a downward direction, a left direction button 40L corresponding to a leftward direction, and a right direction button 40R corresponding to a rightward direction. The buttons 42A, 42B, 42×, and 42Y are used for various kinds of game operations. Note that information indicating a depression state of each of the direction button group 40, and the buttons 42A, 42B, 42×, and 42Y is supplied to the control unit 14.

The left stick 44L and the right stick 44R are used for the operation of specifying a direction as well, for example. The left stick 44L and the right stick 44R stand upright on the surface 30a of the casing of the controller 30, and are configured to be freely tilted to a predetermined angle in every direction from the upright state. Further, the left stick 44L and the right stick 44R can also be pushed in a negative Z-axis direction. The left stick 44L and the right stick 44R can be tilted in the state of being held pushed in the negative Z-axis direction.

Operation state information indicating an operation state of the left stick 44L is supplied to the control unit 14. For example, information indicating a tilt of the left stick 44L in the left-right direction and the up-down direction, and information indicating whether or not the left stick 44L is held pushed, are supplied to the control unit 14. For example, the amount of a tilt in the left-right direction is expressed by a numerical value ranging, for example, from −127 to +127. The value "0" indicates that the left stick 44L is not tilted in the X-axis direction (left-right direction). Further, the value "+127" indicates that the left stick 44L is tilted to its limit in the positive direction of the X-axis (rightward direction). Further, the value "−127" indicates that the left stick 44L is tilted to its limit in the negative direction of the X-axis (leftward direction). The same applies to tilts in the up-down direction. Further, the right stick 44R operates in the same manner as the left stick 44L. Note that hereinbelow a state in which the left stick 44L is not tilted in any of the left-right direction and the up-down direction is referred to as the left stick 44L being in a "neutral state". The same applies to the right stick 44R.

The input/output processing unit 20 scans a state of each of the operation members of the controller 30 at fixed intervals (for example, every 1/60$^{th}$ of a second), and then supplies an operation signal representing scan results thus obtained to the control unit 14 via the bus 12. The information indicating the depression state of each of the direction button group 40, and the buttons 42A, 42B, 42×, and 42Y, and the information indicating the operation state of each of the left stick 44L and the right stick 44R, are also supplied to the control unit 14 as the operation signal. Based on the operation signal, the control unit 14 determines a game operation performed by the user.

On the game device 10, a game configured such that a game character group behaves within a game space is executed. The game character group includes a game character set as an operation subject of a user and a plurality of game characters that are not set as the operation subjects of the user.

Hereinafter, description is given of a case where a game configured such that a user team corresponding to the user and an opponent team play a competitive sport that is played by using a moving object (for example, ball or puck) is executed. Specifically, a case where a soccer game is executed is described. In the soccer game, a soccer match is played between the user team and the opponent team. Note that the opponent team may be operated by a computer or by another user. However, the following description is directed to the case where the opponent team is operated by the computer.

In the case where the soccer game is executed, the game space is built in the main memory 16. FIG. 3 illustrates one example of the game space. A game space 50 illustrated in FIG. 3 is a virtual three-dimensional space in which three coordinate axes orthogonal to one another (Xw-axis, Yw-axis, and Zw-axis) are set. Positions and the like of objects disposed in the game space 50 are identified by those three coordinate axes.

As illustrated in FIG. 3, in the game space 50, there is disposed a field 52, which is an object representing a soccer field. Further disposed on the field 52 are goals 54 that are objects representing goals for soccer, a ball 56 that is an object representing a soccer ball, game characters 58 that are objects representing soccer players belonging to the user team, and game characters 60 that are objects representing soccer players belonging to the opponent team. Although omitted in FIG. 3, eleven game characters 58 and eleven game characters 60 are disposed on the field 52.

One of the goals 54 is associated with the user team, while the other is associated with the opponent team. When the ball 56 moves into the goal 54 associated with any one of the teams, a scoring event occurs for the other one of the teams.

When the game character 58 (60) and the ball 56 come close to each other, the game character 58 (60) and the ball 56 become associated with each other under a predetermined condition. In this case, a moving action of the game character 58 (60) becomes a dribbling action. Hereinafter, the state in which the ball 56 is associated with the game character 58 (60) is referred to as "the game character 58 (60) is keeping the ball 56".

Further, in the game space 50, a virtual camera 62 (viewpoint) is set. A game screen showing the game space 50, which is viewed from the virtual camera 62, is displayed on the display unit 32. For example, in order to constantly display the ball 56 on the game screen, the virtual camera 62 moves in accordance with the position of the ball 56.

Figure 4:
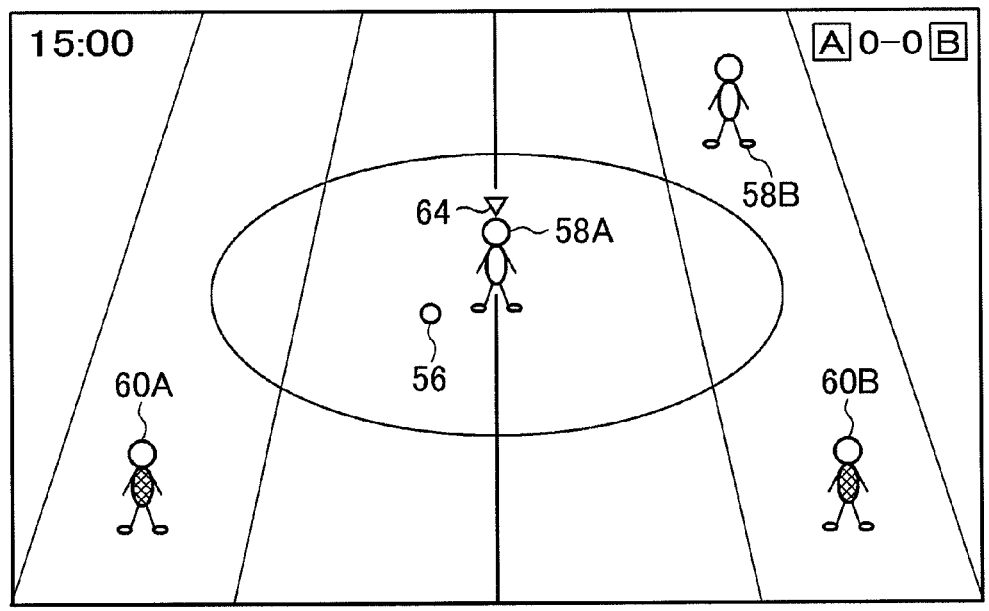
FIG. 4 is a diagram illustrating an example of a game screen.

FIG. 4 illustrates an example of the game screen. On the game screen illustrated in FIG. 4, there are displayed four game characters 58A, 58B, 60A, and 60B. Of those, two game characters 58A and 58B are the game characters 58 belonging to the user team, and the remaining two game characters 60A and 60B are the game characters 60 belonging to the opponent team.

In this soccer game, any one of the game characters 58 belonging to the user team is set as the operation subject of the user. The operation subject of the user is switched among the game characters 58 belonging to the user team. In the game screen illustrated in FIG. 4, a cursor 64 is displayed above a head of the game character 58A. The cursor 64 serves to indicate the game character 58 set as the operation subject of the user.

The game character 58 set as the operation subject of the user behaves based on an operation of the user. For example, the left stick 44L is used for an operation for causing the game character 58 to move, and the game character 58 set as the operation subject of the user moves in a direction specified by the user through use of the left stick 44L. Further, for example, the button 42A is used for an operation for causing the game character 58 to perform a short pass, and when the button 42A is depressed, the game character 58 set as the operation subject of the user performs the short pass. In the same manner, the button 42B is used for an operation for causing the game character 58 to perform a long pass, and when the button 42B is depressed, the game character 58 set as the operation subject of the user performs the long pass. In addition, the button 42X is used for an operation for causing the game character 58 to perform a shot, and when the button 42X is depressed, the game character 58 set as the operation subject of the user performs the shot. Note that a passing direction or a shooting direction in which the game character 58 set as the operation subject of the user performs the short pass, the long pass, or the shot is set based on the direction specified by using the left stick 44L at the time when the buttons 42A, 42B, or 42X is depressed.

Meanwhile, the game characters 58 that are not set as the operation subjects of the user among the game characters 58 belonging to the user team behave in accordance with the operation of the computer. Further, the game characters 60 belonging to the opponent team also behave in accordance with the operation of the computer. Note that in the following description, the game character 58 set as the operation subject of the user among the game characters 58 belonging to the user team is referred to as "user character". The game characters 58 that are not set as the operation subjects of the user among the game characters 58 belonging to the user team are referred to as "fellow characters". Further, the game characters 60 belonging to the opponent team are referred to as "opponent characters".

As described above, the operation subject of the user is switched among the game characters 58 belonging to the user team. Described below is a technology for enabling the user to switch an operation subject to the desired game character 58 with ease.

Figure 5:
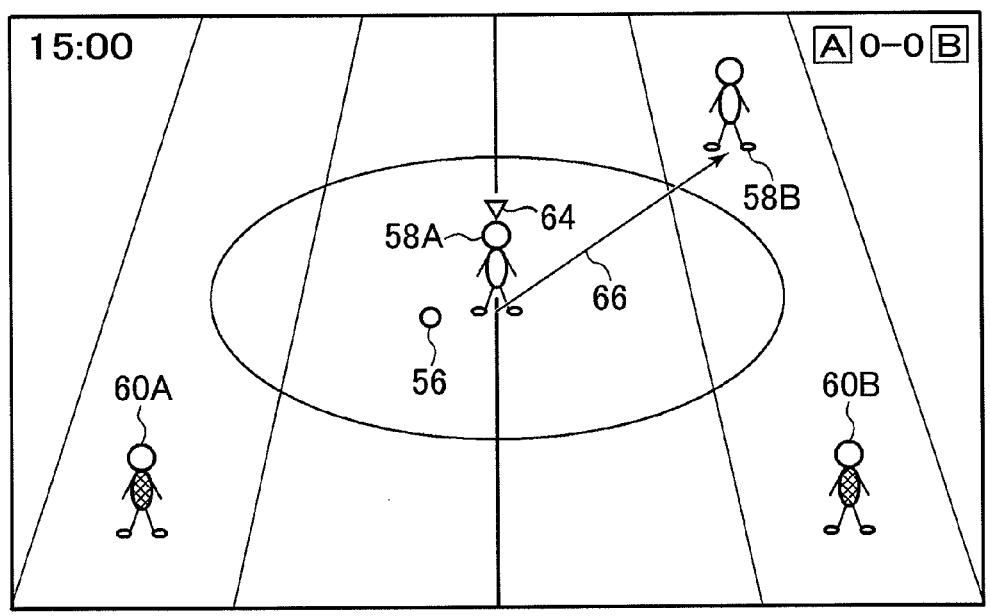
FIG. 5 is a diagram illustrating an operation performed by a user to switch an operation subject.

FIG. 5 is a diagram illustrating an operation performed by the user to switch the operation subject. In FIG. 5, a case where the user is considering switching the operation subject from the game character 58A to the game character 58B is assumed.

Figure 6:
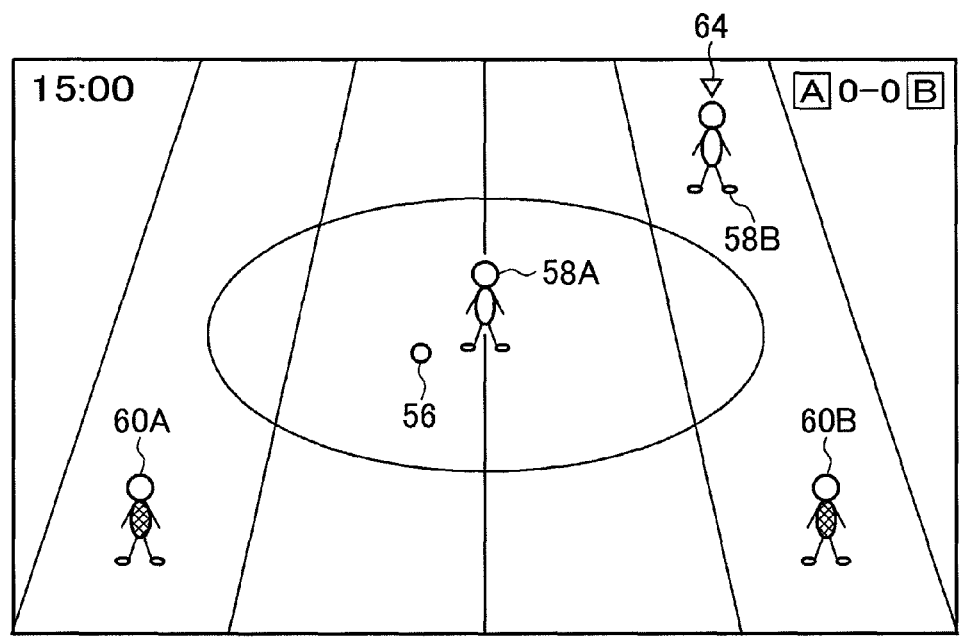
FIG. 6 is a diagram illustrating an example of the game screen.

In this case, the user uses the right stick 44R to designate a direction 66 from the game character 58A to the game character 58B. That is, the user tilts the right stick 44R in a direction corresponding to the direction 66 from the game character 58A to the game character 58B. When the direction 66 from the game character 58A to the game character 58B is designated by using the right stick 44R, the operation subject of the user is switched from the game character 58A to the game character 58B. FIG. 6 illustrates an example of the game screen obtained at this time. On the game screen illustrated in FIG. 6, the cursor 64 is displayed above the head of the game character 58B.

As described above, the game device 10 allows the user to switch the operation subject to the desired game character 58 by using the right stick 44R to designate a direction in which the desired game character 58 exists. In other words, the user can switch the operation subject to the desired game character 58 with ease.

Note that to designate the direction in which the desired game character 58 exists, an operation member (right stick 44R), which is different from the left stick 44L used for an operation for causing the game character 58 set as the operation subject to move, is used. As a result, for example, while causing a game character 58 set as the operation subject to move by using the left stick 44L, the user can smoothly switch the operation object to another game character 58 located in a direction opposite to the moving direction of the game character 58 set as the operation subject.

Figure 7:
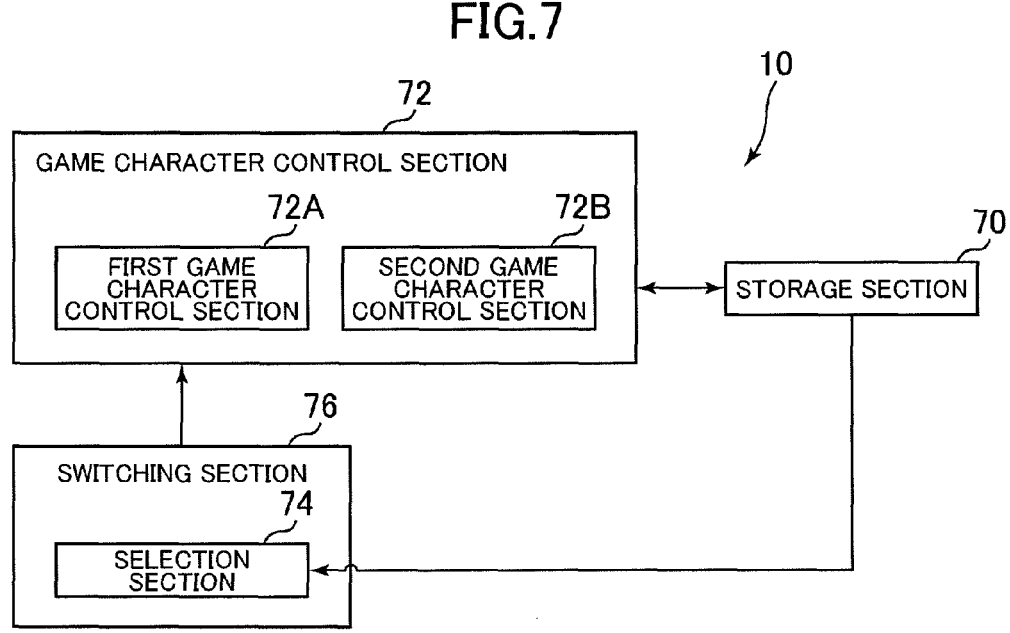
FIG. 7 is a functional block diagram of the game device according to the embodiment of the present invention.

Hereinafter, a configuration for implementing the above-mentioned function is described. FIG. 7 is a functional block diagram illustrating functional blocks relating to the present invention among functions implemented by the game device 10. As illustrated in FIG. 7, the game device 10 includes a storage section 70, a game character control section 72, and a switching section 76. The storage section 70 is implemented by, for example, the main memory 16 and the optical disc 36, and the other functional blocks are implemented by the control unit 14 executing the program read from the optical disc 36.

First, the storage section 70 is described. The storage section 70 stores data necessary for executing the game. For example, the storage section 70 stores model data on each object disposed in the game space, motion data on the game character, and behavior control data (for example, artificial intelligence (AI)) for controlling a behavior of the game character.

Further, for example, the storage section 70 stores ability parameter data relating to abilities of the game character. For example, in the case of the soccer game, examples of abilityparameters include a run parameter, an endurance parameter, a pass ability parameter, a shot abilityparameter, and a free kick abilityparameter. The ability parameters are parameters representing levels of the abilities by, for example, numerical values of "0" to "100".

Figures 8, 9:
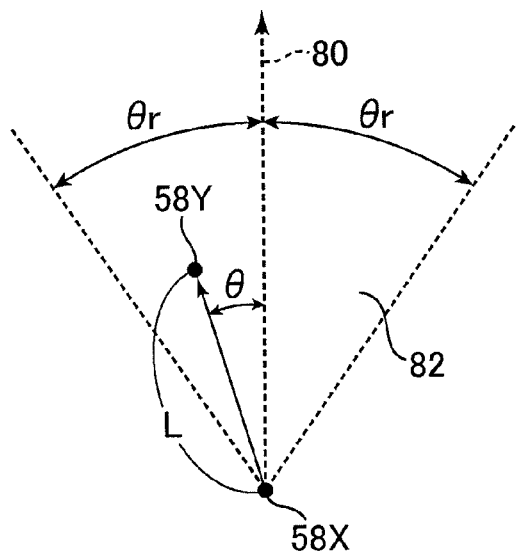
FIG. 8 is a diagram illustrating an example of game character state data.
FIG. 9 is a diagram illustrating an example of an operation of a selection section.

Further, for example, the storage section 70 stores game situation data indicating a current game situation. In the case of a soccer game, for example, game situation data indicating a current situation of a soccer game is stored in the storage section 70. Further, the game situation data includes the following data.
- state data of each of the game characters 58 and 60 (position, moving direction, moving speed, and the like)
- state data of the ball 56 (position, moving direction, moving speed, and the like) state data of the virtual camera 62 (position, direction of sight, angle of view, and the like)
- data indicating a score situation of both teams
- data indicating an elapsed time period from a start of the game FIG. 8 illustrates an example of game character state data indicating the current state of the game characters 58 and 60. Each record of the game character state data illustrated in FIG. 8 includes an "ID" field, a "position" field, a "moving direction" field, an "operation subject flag" field, a "ball-keeping flag" field, and the like.

The "ID" field indicates information for uniquely identifying the game characters 58 and 60. In FIG. 8, "P101" to "P111" are IDs for the game characters 58 belonging to the user team, whereas "P201" to "P211" are IDs for the game characters 60 belonging to the opponent team. The "position" field indicates the current positions of the game characters 58 and 60, whereas the "moving direction" field indicates the current moving directions of the game characters 58 and 60.

The "operation subject flag" field indicates whether or not the game character 58 is set as the operation subject of the user, and takes a value of "0" or "1". The value "0" indicates that the game character 58 is not currently the operation subject of the user. On the other hand, the value "1" indicates that the game character 58 is currently the operation subject of the user. The "ball-keeping flag" field indicates whether or not the game character 58 or 60 is keeping the ball 56, and takes a value of "0" or "1". The value "0" indicates that the game character 58 or 60 is not currently in possession of the ball 56, whereas the value "1" indicates that the game character 58 or 60 is currently in possession of the ball 56.

Description is given of the game character control section 72. The game character control section 72 controls the game character. In the case of this embodiment, the game character control section 72 controls the game characters 58 belonging to the user team and the game characters 60 belonging to the opponent team. The game character control section 72 includes a first game character control section 72A (first control means) and a second game character control section 72B (second control means).

The first game character control section 72A causes the game character 58 set as the operation subject of the user (in other words, user character) among the game characters 58 belonging to the user team to move in a direction acquired based on the operation state of a first operation member. In the case of this embodiment, the left stick 44L corresponds to the "first operation member". Note that the direction button group 40 may be used in place of the left stick 44L. In that case, the direction button group 40 corresponds to the "first operation member".

The second game character control section 72B causes the game characters 58 that are not set as the operation subjects of the user (in other words, fellow characters) among the game characters 58 belonging to the user team to move based on the operation of the computer. The second game character control section 72B causes the fellow characters to move in accordance with the AI.

Description is given of the switching section 76. The switching section 76 switches the operation subject of the user among the plurality of game characters 58 belonging to the user team. The switching section 76 includes a selection section 74.

Description is given of the selection section 74. The selection section 74 selects any one of the game characters 58 (in other words, fellow characters) controlled by the second game character control section 72B based on the direction acquired based on the operation state of a second operation member. In the case of this embodiment, the right stick 44R corresponds to the "second operation member". Note that the direction button group 40 may be used in place of the right stick 44R in a case where the direction button group 40 is not used in place of the left stick 44L. In that case, the direction button group 40 corresponds to the "second operation member".

For example, the selection section 74 selects any one of the fellow characters based on a "distance between the user character and the fellow character" and an "angle between a straight line that extends from the position of the user character in the direction acquired based on the operation state of the right stick 44R and a straight line that extends from the position of the user character toward the position of the fellow character".

FIG. 9 is a diagram illustrating an example of the operation of the selection section 74. Note that in FIG. 9, a reference character "58X" represents a game character 58 set as the operation subject of the user (in other words, current user character), and a reference character "58Y" represents a game character 58 that is not set as the operation subject of the user (in other words, fellow character). Further, a reference character "80" represents a straight line that extends from the position of the user character 58X in the direction corresponding to the operation state of the right stick 44R (in other words, a direction designated by using the right stick 44R). In addition, an reference character "82" represents an area (attention area) defined by straight lines that each extend from the position of the user character 58X so that an angle between a straight line 80 and each of the straight lines is equal to or less than a reference angle θr.

First, the selection section 74 does not select the fellow characters that are not located within the attention area 82. In other words, when an angle θ between the straight line 80 and the straight line that extends from the position of the user character 58X toward the position of the fellow character 58Y is larger than the reference angle θr, the selection section 74 does not select the fellow character.

The selection section 74 calculates an evaluation value for each of the fellow characters located within the attention area 82. Then, the selection section 74 compares the evaluation values of the respective fellow characters with one another to thereby select anyone of the fellow characters located within the attention area 82.

For example, the selection section 74 calculates an evaluation value E based on the following expression (1). Note that in the following expression (1), "L" represents a distance between the user character 58X and the fellow character 58Y. In addition, "p" and "q" are predetermined coefficients, each representing a weight on the above-mentioned angle θ or the above-mentioned distance L.

$$E = 1/(p*\theta + q*L) \quad (1)$$

According to the above-mentioned expression (1), the evaluation value E becomes smaller as the above-mentioned angle θ becomes larger, while the evaluation value E becomes larger as the above-mentioned angle θ becomes smaller. In other words, the evaluation value E becomes larger as a deviation of the position of the fellow character 58Y from the straight line 80 becomes smaller. Further, the evaluation value E becomes smaller as the above-mentioned distance L becomes longer, while the evaluation value E becomes larger as the above-mentioned distance L becomes shorter. In other words, the evaluation value E becomes larger as the fellow character 58Y becomes closer to the user character 58X. For this reason, the selection section 74 selects the fellow character having the largest evaluation value E (in other words, most highly evaluated) as a switching destination of the operation subject.

Note that such a value that becomes smaller as the deviation of the position of the fellow character 58Y from the straight line 80 becomes smaller, and becomes smaller as the fellow character 58Y becomes closer to the user character 58X, may be used as the evaluation value E. In such a case, the selection section 74 may select the fellow character having the smallest evaluation value E (in other words, most highly evaluated) as the switching destination of the operation subject.

The switching section 76 switches the operation subject of the user to the game character selected by the selection section 74. In the case of this embodiment, the switching section 76 switches the operation subject of the user to the fellow character selected by the selection section 74. In this case, the fellow character selected by the selection section 74 becomes a new user character, and the original user character becomes the fellow character.

Figure 10:
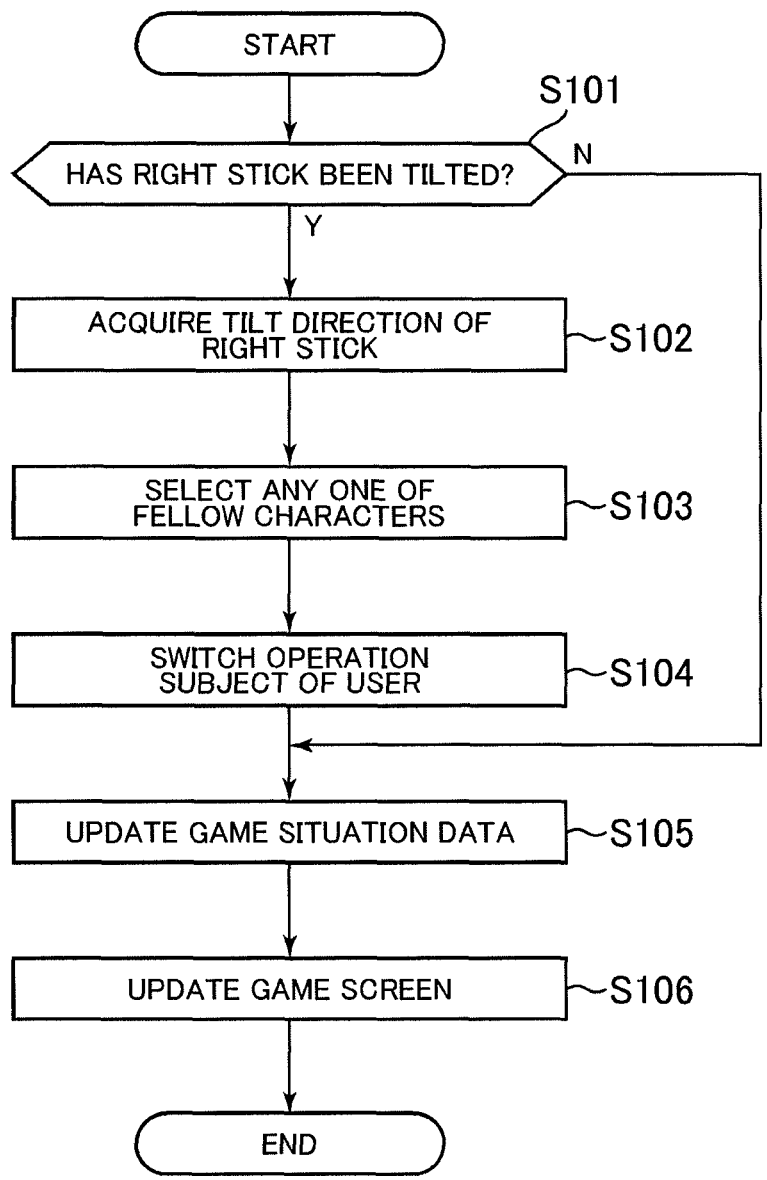
FIG. 10 is a flowchart illustrating an example of processing executed by the game device.

Next, description is given of processing executed by the game device 10 in order to implement the above-mentioned functional blocks. FIG. 10 is a flowchart illustrating an example of processing executed by the game device 10 at predetermined time intervals (for example, every $\frac{1}{60}^{th}$ of a second). The control unit 14 executes the processing illustrated in FIG. 10 in accordance with the program read from the optical disc 36 to thereby function as the game character control section 72 and the switching section 76.

As illustrated in FIG. 10, the control unit 14 determines whether or not the right stick 44R has been tilted (S101). In other words, the control unit 14 determines, based on an operation signal, whether or not the right stick 44R has been changed from a "neutral state" to the "state of being tilted in any one of the directions".

If it is determined that the right stick 44R has not been tilted, the control unit 14 executes the processing of Step S105 described later.

If it is determined that the right stick 44R has been tilted, the control unit 14 acquires a tilt direction of the right stick 44R based on the operation signal (S102), and selects any one of the fellow characters based on the tilt direction of the right stick 44R (S103).

For example, in Step S103, the control unit 14 acquires the direction corresponding to the right stick 44R within the game space 50. After that, the control unit 14 acquires the straight line 80 (see FIG. 9) that extends from the position of the user character in the above-mentioned direction. Further, the control unit 14 determines, for each of the fellow characters, whether or not the angle θ (see FIG. 9) representing the deviation from the above-mentioned the straight line 80 is larger than the reference angle θr. In addition, the control unit 14 calculates the evaluation value E for each of the fellow characters exhibiting the above-mentioned angle θ equal to or smaller than the reference angle θr (that is, each of the fellow characters located in the attention area 82) (see the above-mentioned expression (1)). Then, the control unit 14 compares the evaluation values E of those fellow characters with one another to thereby select any one of those fellow characters.

After the processing of Step S103 is executed, the control unit 14 switches the operation subject of the user to the fellow character selected in Step S103 (S104). In other words, the control unit 14 updates the operation subject flag of game character state data so that the fellow character selected in Step S103 becomes the operation subject of the user. In this case, the operation subject flag of the fellow character selected in Step S103 is updated to "1", while the operation subject flag of the game character 58 that has been set as the operation subject of the user so far is updated to "0".

When the processing of Step S104 is executed, or when it is determined in Step S101 that the right stick 44R has not been tilted, the control unit 14 updates the game situation data (S105).

For example, the control unit 14 determines the moving direction of the user character based on the tilt direction of the left stick 44L, and causes the user character to move in the moving direction. Further, for example, when a short pass button, a long pass button, or a shot button is depressed, the control unit 14 causes the user character to perform the short pass, the long pass, or the shot, respectively.

Further, for example, the control unit 14 causes the fellow characters to behave in accordance with the AI. Note that the control unit 14 also causes the opponent characters to behave in accordance with the AI. Further, when the ball 56 is kicked by any one of the game characters 58 (60), the control unit 14 acquires the moving direction of the ball 56 and causes the ball 56 to move in the moving direction. In addition, the control unit 14 updates data indicating a score situation and data indicating an elapsed time period.

After the processing of Step S105 is executed, the control unit 14 updates the game screen (S106). In other words, the control unit 14 generates the game screen showing the game space 50 viewed from the virtual camera 62 based on the game situation data. The generated game screen is displayed on the display unit 32. This completes the description of the processing illustrated in FIG. 10.

The game device 10 described above enables the operation subject to be switched to the desired game character 58 by designating the direction in which the desired game character 58 exists by use of the right stick 44R. In other words, the game device 10 enables the user to switch the operation subject to the desired game character 58 with ease.

Note that the present invention is not limited to the embodiment described above.

(1) For example, in a case where the user character is keeping the ball 56, the selection section 74 may use the position of the ball 56 in place of the position of the user character. For example, the straight line 80 within FIG. 9 may be a straight line that extends from the position of the ball 56 in the direction corresponding to the operation state of the right stick 44R.

For example, when the user character is dribbling, the user may focus attention on the position of the ball 56 rather than the position of the user character. Further, in the case of switching the operation subject of the user when the user character is dribbling in a large scale (in other words, when the user character is dribbling while keeping a comparatively long distance between the user character and the ball 56), the user needs to operate the right stick 44R in the state in which the distance between the user character and the ball 56 is long. In such a case, if the selection section 74 is configured to select the fellow character based on the position of the user character (see FIG. 9), the user needs to designate the direction from the position of the user character to a desired fellow character by use of the right stick 44R, which raises the danger of the designation of the desired fellow character becoming difficult for the user who is playing the game while focusing attention on the position of the ball 56 rather than the position of the user character. In this respect, the above-mentioned configuration enables the user to designate the desired fellow character with ease even when the user is playing the game while focusing attention on the position of the ball 56 rather than the position of the user character.

(2) For example, when the user team is playing on defense (in other words, when the opponent character is keeping the ball 56), the selection section 74 may select any one of the fellow characters as described below.

In this embodiment, when the user team is playing on defense, the fellow character is configured to mark the opponent character. The expression "marking" means to defend against a specific opponent character while staying closer to the opponent character (while maintaining a distance from the specific opponent character to equal to or less than a fixed distance).

Note that a combination of a marker (game character 58 that performs marking) and a marking target (game character 60 to be marked) is set by the user, for example, before the match or during halftime. Alternatively, during the match, the combination of the marker and the marking target may be set by the user performing an operation for selecting any one of the game characters 58 belonging to the user team as the marker and selecting any one of the game characters 60 belonging to the opponent team as the marking target. Alternatively, during the match, the combination of the marker and the marking target may be set by the AI setting the fellow character as the marker and selecting any one of the game characters 60 belonging to the opponent team as the marking target.

The selection section 74 may select any one of the fellow characters based on whether or not there is a fellow character that is marking the opponent character.

For example, the selection section 74 determines whether or not the fellow character that is marking the opponent character, among the fellow characters, is located within the attention area 82. If the fellow character that is marking the opponent character exists within the attention area 82, the selection section 74 preferentially selects the fellow character.

Note that the wording "preferentially selecting the fellow character that is marking the opponent character" includes, for example, selecting the fellow character that is marking the opponent character irrespective of the evaluation value. In addition, the wording "preferentially selecting the fellow character that is marking the opponent character" also includes making it easier to select the fellow character that is marking the opponent character by changing (for example, increasing) the evaluation value of the fellow character that is marking the opponent character. In other words, the wording "preferentially selecting the fellow character that is marking the opponent character" includes adding a predetermined numerical value to the evaluation value of the fellow character that is marking the opponent character or multiplying the evaluation value of the fellow character that is marking the opponent character by a coefficient greater than one.

(3) For example, the selection section 74 may select any one of the fellow characters based on a positional relationship between the straight line connecting the position of the user character and the position of the fellow character and the position of the opponent character.

For example, the selection section 74 determines whether or not the positional relationship between the straight line connecting the position of the user character and the position of the fellow character and the position of the opponent character has a predetermined positional relationship. For example, the selection section 74 determines whether or not the opponent character is located on the straight line connecting the position of the user character and the position of the fellow character. Alternatively, the selection section 74 determines whether or not the opponent character is close to the straight line connecting the position of the user character and the position of the fellow character. For example, the selection section 74 determines whether or not the normal to the straight line from the position of the opponent character has a length shorter than a reference value, to thereby determine whether or not the straight line and the position of the opponent character are close to each other.

If it is determined that the positional relationship between the straight line connecting the position of the user character and the position of the fellow character and the position of the opponent character is a predetermined positional relationship, the selection section 74 does not select the fellow character. Alternatively, the selection section 74 changes (for example, reduces) the evaluation value of the fellow character to thereby make it harder to select the fellow character. In other words, the selection section 74 subtracts a predetermined numerical value from the evaluation value of the fellow character or multiplies the evaluation value of the fellow character by a coefficient smaller than one.

With this configuration, the fellow character to which the operation subject of the user is to be switched can be selected in consideration of the position of the opponent character.

(4) For example, the selection section 74 may select any one of the fellow characters based on the situation of the match.

Figures 11, 12, 13:
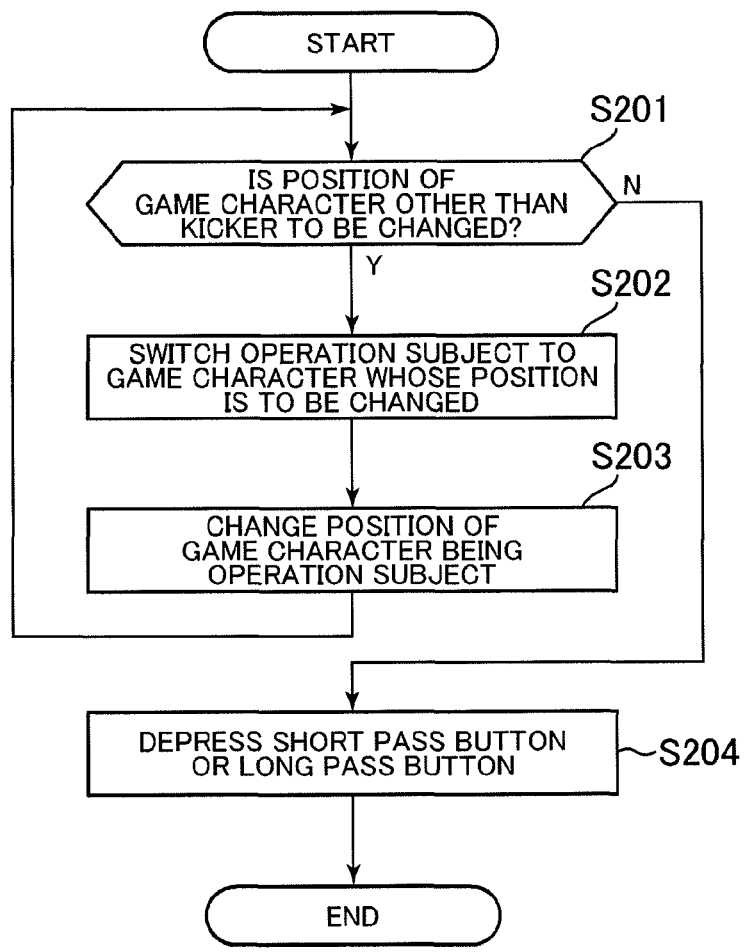
FIG. 11 is a diagram illustrating an example of correspondence data.
FIG. 12 is a diagram illustrating an example of the correspondence data.
FIG. 13 is a diagram illustrating an example of an operation procedure performed by the user in a scene of a free kick.

For example, the selection section 74 may select any one of the fellow characters based on correspondence data as illustrated in FIG. 11 and a current situation of the match. The correspondence data illustrated in FIG. 11 indicates a correspondence between the situation of the match and a type of the game character 58 (the fellow character) to be selected in the situation. For example, in the correspondence data illustrated in FIG. 11, a "situation in which the opponent team has a lead over the user team" and the "game character 58 having a high offense ability" (in other words, a game character 58 having a parameter relating to the offense ability of a value equal to or greater than a reference value) are associated with each other.

The selection section 74 acquires the "type of the game character 58 to be selected" associated with the current situation of the match based on the correspondence data illustrated in FIG. 11. Then, the selection section 74 determines whether or not the fellow character belonging to the type is located within the attention area 82. If the fellow character belonging to the type is located within the attention area 82, the selection section 74 selects the fellow character. With this configuration, the operation subject of the user can be switched to the game character 58 suitable for the current situation of the match.

(5) For example, the selection section 74 may select any one of the fellow characters based on tactics employed by the user team.

For example, the selection section 74 may select any one of the fellow characters based on correspondence data as illustrated in FIG. 12 and the tactics employed by the user team. The correspondence data illustrated in FIG. 12 indicates a correspondence between the tactics (for example, side attack or counter attack) that can be employed by the user team and the type of the game character 58 (fellow character) to be selected. For example, in the correspondence data illustrated in FIG. 12, the tactics and the type of the game character 58 suitable for carrying out the tactics are associated with each other. Specifically, for example, the "side attack" and the "game character 58 located in the vicinity of a sideline" are associated with each other.

The selection section 74 acquires the "type of the game character 58 to be selected" associated with the tactics employed by the user team based on the correspondence data illustrated in FIG. 12. Then, the selection section 74 determines whether or not the fellow character belonging to the type is located within the attention area 82. If the fellow character belonging to the type is located within the attention area 82, the selection section 74 selects the fellow character. With this configuration, the operation subject of the user can be switched to the game character 58 suitable for the tactics employed by the user team.

(6) For example, the selection section 74 may select any one of the fellow characters based on tactics employed by the opponent team.

In the same manner as modified example (5), the selection section 74 may select any one of the fellow characters based on the correspondence data as illustrated in FIG. 12. However, in this case, in the correspondence data illustrated in FIG. 12, the tactics (for example, side attack or counter attack) that can be employed by the opponent team and the type of the game character 58 suitable for interfering the tactics are associated with each other. In this case, the selection section 74 selects any one of the fellow characters based on the correspondence data illustrated in FIG. 12 and the tactics employed by the opponent team.

The selection section 74 acquires the "type of the game character 58 to be selected" associated with the tactics employed by the opponent team based on the correspondence data illustrated in FIG. 12. Then, the selection section 74 determines whether or not the fellow character belonging to the type is located within the attention area 82. If the fellow character belonging to the type is located within the attention area 82, the selection section 74 selects the fellow character. With this configuration, the operation subject of the user can be switched to the game character 58 suitable for the tactics employed by the opponent team.

(7) For example, the user may be able to switch the operation subject also during a period of time before a free kick, a corner kick, a goal kick, or a throw-in is executed in a scene in which the game character 58 of the user team performs the free kick or the like. In other words, the user may be able to switch the operation subject to thereby change the position of the game character 58 other than the game character 58 that performs the free kick or the like.

FIG. 13 illustrates an example of an operation procedure performed by the user in the scene of the free kick. As illustrated in FIG. 13, in a case of changing the position of the game character 58 other than the game character 58 being a kicker (Y in S201), the user switches the operation subject to the game character 58 whose position is to be changed (S202). The operation performed in this case is the same as the operation described with reference to FIGS. 5 and 6. In other words, the user tilts the right stick 44R in the direction corresponding to the direction from the position of the game character 58 being the operation subject (that is, user character) at that time to the game character 58 whose position is to be changed.

If the game character 58 whose position is to be changed is changed to the operation subject, the user changes the position of the game character 58 that is newly set as the operation subject (S203). In other words, the user operates the left stick 44L to thereby cause the game character 58 that is newly set as the operation subject to move to a desired position. After that, the user determines whether or not to continuously change the position of another game character 58 (S201). In the case of changing the position of another game character 58, the user performs the same operation.

On the other hand, if the position of the game character 58 is not to be changed (N in S201), in other words, if the changing of the position of the game character 58 other than the game character 58 being the kicker has been completed, the user depresses the short pass button or the long pass button (S204).

In this case, the game character 58 being the kicker performs the short pass or the long pass. Further, in this case, a target position of the short pass or the long pass is set based on the position of the game character 58 being the operation subject of the user at the time when the short pass button or the long pass button is depressed. In other words, the short pass or the long pass is performed with respect to the game character 58 being the operation subject of the user at the time when the short pass button or the long pass button is depressed.

Note that the processing to be executed by the game device 10 in order to enable the user to perform such an operation procedure as illustrated above is substantially the same as the processing illustrated in FIG. 10. In other words, also during the period of time before the free kick is executed in the scene in which the game character 58 of the user team performs the free kick, the processing illustrated in FIG. 10 may be executed at predetermined time intervals (for example, every $\frac{1}{60}^{th}$ of a second). However, if it is determined that the short pass or the long pass button has been depressed in the scene of the free kick, the control unit 14 causes the game character 58 being the kicker to perform the short pass or the long pass. Further, in this case, the control unit 14 sets the target position of the short pass button or the long pass button based on the position of the game character 58 being the operation subject of the user at the time when the short pass button or the long pass button is depressed.

In the above-mentioned manner, the user can perform an operation on the game character 58 other than the kicker during the period of time before the free kick or the like is performed. In other words, the user can operate the game character 58 so as to perform an action of receiving a pass from the kicker or the like.

(8) Note that in the above-mentioned modified example (7), the selection performed by the selection section 74 (or switching performed by the switching section 76) may be restricted based on the ability parameter of the game character 58 that performs the free kick, the corner kick, the goal kick, or the throw-in.

In the case of restricting the selection performed by the selection section 74 (or switching performed by the switching section 76) based on the ability parameter of the game character 58, it is necessary to provide information indicating the correspondence between the ability parameter of the game character 58 and a restriction content of the selection performed by the selection section 74 (or switching performed by the switching section 76). FIG. 14 illustrates an example of the correspondence data indicating the above-mentioned correspondence. In the correspondence data illustrated in FIG. 14, the correspondence between a range of the ability parameter (p) and the restriction content is set so that, for example, the degree of restriction becomes higher as the ability becomes lower. For this reason, a "restriction content A" is set to have a higher degree of restriction than a "restriction content B".

Here, examples of the "restriction content" are described. Here, the description is given by assuming a case where the free kick is performed. Note that cases of the corner kick, the goal kick, or the throw-in are the same as the case of the free kick.

For example, based on the ability parameter of the game character 58 that performs the free kick, the game device 10 restricts the number of times that the selection is performed by the selection section 74 (or switching is performed by the switching section 76) during the period of time before the free kick is performed.

In this case, the "restriction content A" within the correspondence data illustrated in FIG. 14 indicates that, for example, the number of times that the selection is performed by the selection section 74 (or switching is performed by the switching section 76) is restricted to M. Further, the "restriction content B" indicates that, for example, the number of times that the selection is performed by the selection section 74 (or switching is performed by the switching section 76) is restricted to N (M<N).

Further, for example, based on the ability parameter of the game character 58 that performs the free kick, the game device 10 restricts the game character that can be selected by the selection section 74 (or game character to which the operation subject of the user can be switched by the switching section 76) during the period of time before the free kick is performed.

In this case, the "restriction content A" within the correspondence data illustrated in FIG. 14 indicates that, for example, the game character 58 that can be selected by the selection section 74 (or game character 58 to which the operation subject of the user can be switched by the switching section 76) is restricted to the game character 58 around which M opponent characters are located. Note that the "game character 58 around which M opponent characters are located" is such a game character 58 as to have, for example, M opponent characters located within a range of a predetermined distance from the game character 58.

Further, the "restriction content B" indicates that, for example, the game character 58 that can be selected by the selection section 74 (or game character 58 to which the operation subject of the user can be switched by the switching section 76) is restricted to the game character 58 around which N (M<N) opponent characters are located.

In the above-mentioned manner, the switching of the operation subject of the user during the period of time before the free kick or the like is performed can be restricted based on the ability of the game character 58 that performs the free kick, the corner kick, the goal kick, or the throw-in.

(9) For example, in the case where the operation subject of the user is switched from a given game character 58 (here, referred to as "game character A") to another game character 58 (here, referred to as "game character B"), the first game character control section 72A may restrict the action of the game character B based on a relationship between the game character A and the game character B.

In this case, the storage section 70 stores a parameter relating to the relationship (for example, cooperativeness or congeniality) between the game characters 58 belonging to the user team in association with the combination thereof.

FIG. 15 illustrates an example of cooperativeness parameter data stored in the storage section 70. The cooperativeness parameter data illustrated in FIG. 15 includes "combination of game characters" and "cooperativeness parameter" fields. The "combination of game characters" field indicates a combination of IDs of two game characters 58 belonging to the user team. Stored in the "cooperativeness parameter" field is a cooperativeness parameter. The cooperativeness parameter indicates the level of cooperativeness of the two game characters 58. Specifically, the cooperativeness parameter takes numerical values of "0" to "100", and a larger value of the cooperativeness parameter indicates a higher cooperativeness between the two game characters 58.

Based on the parameter (cooperativeness parameter) associated with the combination of the game characters A and B, the first game character control section 72A restricts the action of the game character B obtained after the operation subject of the user has been switched from the game character A to the game character B.

In the case of restricting the action of the game character B based on the parameter (cooperativeness parameter) associated with the combination of the game characters A and B, it is necessary to provide data indicating the correspondence between the parameter and the restriction content of an action. FIG. 16 illustrates an example of restricted content data indicating the correspondence between the cooperativeness parameter and the restriction content of the action. For example, in the restricted content data illustrated in FIG. 16, the correspondence between the range of the cooperativeness parameter (p) and the restriction content of the action is set so that the content of restriction imposed on the action of the game character 58 becomes stricter as the cooperativeness becomes lower.

In the case of restricting the action of the game character B based on the parameter (cooperativeness parameter) associated with the combination of the game characters A and B, the first game character control section 72A references the restricted content data illustrated in FIG. 16 to thereby acquire the restriction content corresponding to the parameter (cooperativeness parameter) associated with the combination of the game characters A and B and restrict the action of the game character B.

Note that the "restricting the action of the game character B" includes, for example, restricting the moving direction of the game character B.

In this case, the "restriction content A" within the restriction content data illustrated in FIG. 16 is, for example, to restrict the number of directions in which the game character B can move to M. For example, "M" is "4", and the "restriction content A" is to restrict the direction in which the game character B can move to, for example, four directions of the positive Xw-axis direction, the negative Xw-axis direction, the positive Zw-axis direction, and the negative Zw-axis direction.

Further, the "restriction content B" is, for example, to restrict the number of directions in which the game character B can move to N (M<N). For example, "N" is "8", and the "restriction content B" is to restrict the direction in which the game character B can move to, for example, eight directions of the positive Xw-axis direction, the negative Xw-axis direction, the positive Zw-axis direction, the negative Zw-axis direction, an intermediate direction between the positive Xw-axis direction and the positive Zw-axis direction, an intermediate direction between the negative Xw-axis direction and the positive Zw-axis direction, an intermediate direction between the negative Xw-axis direction and the negative Zw-axis direction, and an intermediate direction between the positive Xw-axis direction and the negative Zw-axis direction.

In the above-mentioned manner, in the case where the operation subject of the user is switched from the game character A to the game character B, the action of the game character B after the operation subject of the user has been switched is restricted based on the relationship between the game character A and the game character B. As a result, it is possible to cause the user to get a solid feel for the relationship between the game character A and the game character B.

(10) For example, the game space may be a virtual two-dimensional space in which two coordinate axes are set. That is, the game space may be a virtual two-dimensional space in which the positions and the like of game characters and a ball are managed by two coordinate elements.

(11) For example, the present invention can be applied to sports games (such as a basketball game, an ice hockey game, a baseball game, or the like) other than the soccer game. Further, the present invention can also be applied to games other than sports games.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device, comprising:
   a first operation member for allowing a user to perform a direction instruction operation;
   a second operation member for allowing the user to perform a direction instruction operation;
   switching means for switching an operation subject of the user among a plurality of game characters that are on a team of the user;
   first control means for causing a game character that is set as the operation subject of the user among the plurality of game characters to behave based on a direction acquired based on an operation state of the first operation member; and
   second control means for causing game characters that are not set as the operation subject of the user among the plurality of game characters to behave based on an operation of a computer, wherein:
   the switching means comprises selection means for selecting any one of the game characters that are controlled by the second control means based on a direction acquired based on an operation state of the second operation member; and
   the switching means switches the game character that is the operation subject of the user to the any one of the game characters selected by the selection means, and
   wherein the game device further comprises:
   means for acquiring a storage content of means for storing a parameter in association with a combination of the plurality of game characters, said parameter being a parameter relating to cooperativeness or congeniality between the combination of the plurality of game characters; and
   restriction means for restricting, in a case where the operation subject of the user is switched by the switching means from a first game character to a second game character, an action of the second game character after the operation subject of the user has been switched to the second game character based on the parameter associated with the combination of the first game character and the second game character and related to the cooperativeness or congeniality between the first game character and the second game character.

2. The game device according to claim 1, wherein the selection means selects the any one of the game characters controlled by the second control means based on (1) a distance between the game character controlled by the first control means and the game character controlled by the second control means and (2) an angle between a straight line that extends from a position of the game character controlled by the first control means in the direction acquired based on the operation state of the second operation member and a straight line that extends from the position of the game character controlled by the first control means toward a position of the game character controlled by the second control means.

3. The game device according to claim 1, wherein:
   the game device executes a game that imitates a competitive sport, performed by using a moving object, between a user team corresponding to the user and an opponent team;
   the plurality of game characters comprise a plurality of game characters belonging to the user team; and
   the selection means selects the any one of the game characters controlled by the second control means based on (1) a distance between the moving object and the game character controlled by the second control means and (2) an angle between a straight line that extends from a position of the moving object in the direction acquired based on the operation state of the second operation member and a straight line that extends from the position of the moving object toward a position of the game character controlled by the second control means.

4. The game device according to claim 1, wherein the restriction means restricts, in the case where the operation subject of the user is switched by the switching means from the first game character to the second game character, a number of directions in which the second game character can move after the operation subject of the user has been switched to the second game character based on the parameter associated with the combination of the first game character and the second game character.

5. The game device according to claim 1, wherein:
an opponent character that opposes the plurality of game characters is disposed in a game space; and
the selection means selects the any one of the game characters controlled by the second control means based on a relationship between a direction from a position of the game character controlled by the first control means to a position of the game character controlled by the second control means and a position of the opponent character.

6. The game device according to claim 1, wherein:
the game device executes a game comprising a soccer game that imitates a soccer match performed between a user team corresponding to the user and an opponent team;
the plurality of game characters comprise a plurality of game characters belonging to the user team;
the switching means switches the operation subject of the user among the plurality of game characters belonging to the user team during a period of time before one of a free kick, a corner kick, a goal kick, and a throw-in is performed in a scene in which any one of the plurality of game characters belonging to the user team performs the one of the free kick, the corner kick, the goal kick, and the throw-in;
the first control means causes, during the period of time, the game character that is set as the operation subject of the user among the plurality of game characters belonging to the user team to behave based on the direction acquired based on the operation state of the first operation member;
the second control means causes, during the period of time, the game character that is not set as the operation subject of the user among the plurality of game characters belonging to the user team to behave based on the operation of the computer;
the selection means selects, during the period of time, the any one of the game characters controlled by the second control means based on the direction acquired based on the operation state of the second operation member;
the switching means switches, in a case where the any one of the game characters controlled by the second control means is selected by the selection means during the period of time, the operation subject of the user to the any one of the game characters selected by the selection means; and
the game device causes, in a case where a predetermined execution instruction operation is performed during the period of time, the game character that performs the one of the free kick, the corner kick, the goal kick, and the throw-in to execute a pass to the game character controlled by the first control means.

7. The game device according to claim 6, further comprising means for restricting one of selection performed by the selection means during the period of time and switching performed by the switching means during the period of time based on ability information relating to abilities of the game character that performs the one of the free kick, the corner kick, the goal kick, and the throw-in.

8. The game device according to claim 7, further comprising means for restricting a number of times that the switching means can switch the operation subject of the user during the period of time based on the ability information.

9. The game device according to claim 7, further comprising means for restricting the game character that can be selected by the selection means during the period of time based on the ability information.

10. The game device according to claim 1, wherein the selection means selects the any one of the game characters controlled by the second control means based on a situation of a game involving the plurality of game characters.

11. The game device according to claim 1, wherein the selection means selects the any one of the game characters controlled by the second control means based on user tactics or opponent tactics employed in a game involving the plurality of game characters.

12. A method of controlling a game device,
the game device comprising:
a first operation member for allowing a user to perform a direction instruction operation; and
a second operation member for allowing the user to perform a direction instruction operation,
the method comprising:
switching, by one or more microprocessors, an operation subject of the user among a plurality of game characters that are on a team of the user;
causing, by one or more microprocessors, a game character that is set as the operation subject of the user among the plurality of game characters to behave based on a direction acquired based on an operation state of the first operation member; and
causing, by one or more microprocessors, game characters that are not set as the operation subject of the user among the plurality of game characters to behave based on an operation of a computer,
wherein the switching comprises:
selecting, by one or more microprocessors, any one of the game characters that are not set as the operation subject of the user based on a direction acquired based on an operation state of the second operation member; and
switching the game character that is the operation subject of the user to the selected one of the game characters, and
wherein the method further comprises:
acquiring a storage content of a storage that stores a parameter in association with a combination of the plurality of game characters, said parameter being a parameter relating to cooperativeness or congeniality between the combination of the plurality of game characters; and
restricting, in a case where the operation subject of the user is switched from a first game character to a second game character, an action of the second game character after the operation subject of the user has been switched to the second game character based on the parameter associated with the combination of the first game character and the second game character and related to the cooperativeness or congeniality between the first game character and the second game character.

13. A non-transitory computer readable information storage medium having a program for causing a computer to function as a game device recorded thereon,
the computer comprising:
a first operation member for allowing a user to perform a direction instruction operation; and
a second operation member for allowing the user to perform a direction instruction operation,
the program causing the computer to:
switch an operation subject of the user among a plurality of game characters that are on a team of the user;
cause a game character that is set as the operation subject of the user among the plurality of game characters to behave based on a direction acquired based on an operation state of the first operation member; and
cause game characters that are not set as the operation subject of the user among the plurality of game characters to behave based on an operation of the computer, wherein:
the program causes the computer to select any one of the game characters that are not set as the operation subject of the user based on a direction acquired based on an operation state of the second operation member; and
switch the game character that is the operation subject of the user to the selected one of the game characters, and
wherein the program further causes the computer to:
acquire a storage content of a storage that stores a parameter in association with a combination of the plurality of game characters, said parameter being a parameter relating to cooperativeness or congeniality between the combination of the plurality of game characters; and
restrict, in a case where the operation subject of the user is switched from a first game character to a second game character, an action of the second game character after the operation subject of the user has been switched to the second game character based on the parameter associated with the combination of the first game character and the second game character and related to the cooperativeness or congeniality between the first game character and the second game character.

14. A game device, comprising:
a game controller including a plurality of operation members, each operation member performing a direction instruction operation; and
at least one microprocessor configured to:
cause a game character that is set as an operation subject of a user among a plurality of game characters to behave based on a direction acquired based on an operation state of one of the operation members, the plurality of game characters being on a team of the user,
cause game characters that are not set as the operation subject of the user among the plurality of game characters to behave based on an operation of a computer,
select one of the game characters that are not set as the operation subject of the user based on a direction acquired based on an operation state of another one of the operation members, and
switch the game character that is the operation subject of the user to the selected one of the game characters,
wherein the at least one microprocessor acquires from a storage a parameter associated with a combination of the switched game characters, and restricts, after the game characters are switched, an action of the game character that is the operation subject of the user based on the acquired parameter, said parameter being a parameter relating to cooperativeness or congeniality between the switched game characters.

* * * * *